(12) United States Patent  (10) Patent No.: US 7,668,647 B2
Barber et al.  (45) Date of Patent: Feb. 23, 2010

(54) COMPUTER METHOD AND APPARATUS FOR FILLING IN AN ENTRY FIELD USING GEOGRAPHICAL PROXIMITY AND CHARACTER CRITERIA

(75) Inventors: Frederic D. Barber, Beverly, MA (US); Stephen C. Kroese, Lexington, MA (US); Steven Lindsley, Melbourne, FL (US)

(73) Assignee: Avidyne Corporation, Lincoln, MA (US)

( * ) Notice: Subject to any disclaimer, the term of this patent is extended or adjusted under 35 U.S.C. 154(b) by 379 days.

(21) Appl. No.: 11/786,523

(22) Filed: Apr. 12, 2007

(65) Prior Publication Data

US 2008/0177465 A1   Jul. 24, 2008

Related U.S. Application Data

(60) Provisional application No. 60/792,289, filed on Apr. 14, 2006.

(51) Int. Cl.
  *G01C 21/00*  (2006.01)
(52) U.S. Cl. .................. 701/206; 701/201; 701/300
(58) Field of Classification Search ............ 701/3, 701/14, 16, 23, 25, 35, 26, 122, 201, 204, 701/206, 210, 209, 300; 340/995.1, 979; 244/183; 342/33
  See application file for complete search history.

(56) References Cited

U.S. PATENT DOCUMENTS

| | | | | | |
|---|---|---|---|---|---|
| 4,692,869 | A | * | 9/1987 | King et al. .................. | 701/206 |
| 5,398,186 | A | * | 3/1995 | Nakhla ........................ | 701/16 |
| 5,416,705 | A | * | 5/1995 | Barnett ....................... | 701/14 |
| 5,526,265 | A | * | 6/1996 | Nakhla ........................ | 701/16 |
| 5,842,142 | A | * | 11/1998 | Murray et al. ................ | 701/16 |
| 5,844,503 | A | * | 12/1998 | Riley et al. ................. | 340/945 |
| 6,112,141 | A | * | 8/2000 | Briffe et al. ................... | 701/14 |
| 6,856,864 | B1 | | 2/2005 | Gibbs et al. | |

* cited by examiner

*Primary Examiner*—Gertrude Arthur Jeanglaud
(74) *Attorney, Agent, or Firm*—Hamilton, Brook, Smith & Reynolds, P.C.

(57) ABSTRACT

Entering an identifier to select a navigational waypoint requires "head-down" time, resulting in less time for operating a vehicle. Accordingly, a technique for selecting a navigational waypoint for use is provided. The present invention includes receiving a partially entered identifier identifying, in part, a navigational waypoint for use, searching for the navigational waypoint for use from amongst a plurality of identifiers using the partially entered identifier and a search criterion other than a criterion based on a pre-existing ordering of the plurality of identifiers, and completing the partially entered waypoint identifier based on results from the searching. The completed waypoint identifier forms a user-selectable navigational waypoint for use. The present invention uses as a search criterion a geographical relationship between a location of each identifier of the plurality and a reference location/area to reduce the number of user-entered characters needed to select a navigational waypoint, thereby reducing "head-down" time.

27 Claims, 13 Drawing Sheets

Filling entry field using autofill:

Filling entry field using GeoFill:

Enter search string = "AC" (207a)

Enter search string = "ACA" (207b)

US 7,668,647 B2

COMPUTER METHOD AND APPARATUS FOR FILLING IN AN ENTRY FIELD USING GEOGRAPHICAL PROXIMITY AND CHARACTER CRITERIA

RELATED APPLICATION

This application claims the benefit of U.S. Provisional Application No. 60/792,289, filed Apr. 14, 2006. The entire teachings of the above application are incorporated herein by reference.

BACKGROUND OF THE INVENTION

Navigation is the science of moving a vehicle or person from one place to another place. More specifically, the science of navigation deals with methods for determining position, course, distance traveled, and of planning steering commands that will result in motion along an intended path from one place to another place. Position is generally determined with regards to a fixed coordinate system, for example, the familiar system of latitude and longitude for terrestrial or nautical navigation. Position fixing methods often make use of navigational aids, whose positions with respect to the navigational coordinate system are known or can be calculated as the basis for determining the location of the vehicle. For example, celestial bodies, e.g., stars, sun, and moon have been used since antiquity to aid sailors in navigating the seas, while a constellation of Global Positioning System (GPS) satellites serves much the same need in a modern, automated fashion. Waypoints, whose positions with respect to the navigational coordinate system are fixed and known, are used to define locations with significance to the navigational problem at hand. For ease of reference, waypoints are generally assigned a waypoint identifier.

SUMMARY OF THE INVENTION

Using a computerized navigation device to navigate a path (or a track) from a first point (e.g., an origin) to a second point (e.g., a destination), a navigator enters descriptions (or indications) of the first point and the second point into the navigation device. In response the navigation device then displays the path to be navigated. In the case of a flight plan, a flight crew member (e.g., a pilot) enters a first waypoint identifier and a second waypoint identifier into a Flight Management System (FMS) or other similar area navigation device using a keypad or other data entry device. The FMS then renders a display of the flight plan on a display monitor, such as a Multifunction Display (MFD).

One method for entering a waypoint identifier into the FMS requires entering the complete text of the waypoint identifier. The pilot, via the keyboard, enters (or keys in) each and every character of the waypoint identifier into the FMS. This requires the pilot to spend "head-down" time. That is, rather than flying the aircraft, the pilot is busy keying in waypoint identifiers character by character. The problem of requiring "head-down" time is further aggravated by short duration and/or high speed flights where the pilot has little time to spare keying in each and every character of a waypoint identifier (candidate).

Another problem relating to having to key in or otherwise enter each and every character of a waypoint identifier is unrestricted entry. Because this method requires entering the complete text, the pilot may enter characters for a waypoint identifier not contained in a navigation database, i.e., an invalid entry. Consequently, the problem of unrestricted entry requires an ability to annunciate or otherwise indicate invalid entries to the user or pilot.

To remedy these problems "smart" or automatic text entry systems have been developed to automatically complete a text entry field. These text entry systems allow the pilot to enter one or more characters of a desired waypoint identifier into the subject field, and the system then automatically displays the complete text of a most likely waypoint identifier.

These systems are based on an alphanumerical entry. A search string is used to determine which waypoint identifiers include the one or more piloted-entered characters. Thus, the more similar waypoint identifiers are to one another, the more pilot-entered characters are required to identify the desired waypoint identifier. For example, a collection of waypoint identifiers contains waypoint identifiers, "A," "AA," and "AAA." Using a search string "A," all the waypoint identifiers are equally likely to be identified as the desired waypoint identifier (candidate). The waypoint identifier "A" can be completed from the search string of "A," as can the waypoint identifiers "AA" and "AAA." Adding an additional "A" to the search string (i.e., the search string is now "AA") reduces the likely (candidate) waypoint identifiers to either "AA" or "AAA". Further adding an "A" to the search string (i.e., the search string is now "AAA") further reduces the likely (candidate) waypoint identifier to only "AAA." In this example, for each additional character entered, the number of likely (candidate) waypoint identifiers is reduced by one. In the worst case, identifying the desired waypoint identifier requires entering the complete text of the desired waypoint identifier.

The efficiency with which a pilot or navigator can enter waypoints, and thus the amount of attention he or she must apply to operating the navigation system as opposed to other activities on the airplane, is dependent on the number of characters he or she must enter in order for the system to correctly identify the desired waypoint.

Accordingly, what is a needed is a method or a corresponding apparatus for filling in an entry field requiring the least number of characters entered.

It is easily appreciated that the likelihood of a given waypoint being the desired waypoint may be influenced by factors other than alphanumerical order. In particular, the geographical position of a given waypoint may exert a considerable influence on its likelihood of being the desired waypoint.

Most navigational problems involve piecing or otherwise assembling a flight plan from a series of segments or legs, each of which describes an intended path from one waypoint to another. As the description of such a flight plan is initiated, waypoints near the point of origin are typically more likely to be the desired next waypoint than are waypoints more distant from the point of origin. As the description of the flight plan progresses, each subsequent waypoint is more likely to be found near the most recently entered waypoint than far from it. Thus, a waypoint identifier completion technique which permits the use of a geographical reference point in evaluating candidate completions can result in greater overall efficiency.

A computer implemented method and corresponding computer system for selecting a navigational waypoint for use includes: i) receiving a partially entered waypoint identifier identifying, in part, a navigational waypoint for use, ii) searching for the navigational waypoint for use from amongst a plurality of waypoint identifiers using the partially entered waypoint identifier and a search criterion other than a criterion based on a pre-existing ordering of the plurality of waypoint identifiers, and iii) completing the partially entered waypoint identifier based on results from the searching, the completed waypoint identifier forming a user-selectable navigational waypoint for use.

In an alternative embodiment, a computer implemented method and corresponding apparatus for filling in an entry field with a desired waypoint identifier includes: i) generating an initial vicinity list of waypoint identifiers from a database of waypoint identifiers using a reference position and a vicinity term, ii) generating a final vicinity list of waypoint identifiers from the initial vicinity list of waypoint identifiers using a search string followed by a character from a set of characters, iii) generating an autofill list of waypoint identifiers from the database of waypoint identifiers using the search string followed by a character from the set of characters, and iv) generating a GeoFill list of waypoint identifiers from a combination of the final vicinity list of waypoint identifiers and the autofill list of waypoint identifiers using the search string followed by a character from the set of characters, the GeoFill list of waypoint identifiers being used to fill in the entry field.

BRIEF DESCRIPTION OF THE DRAWINGS

The foregoing and other objects, features and advantages of the present invention will be apparent from the following more particular description of preferred embodiments of the present invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of example embodiments of the present invention follows.

Figure 1:
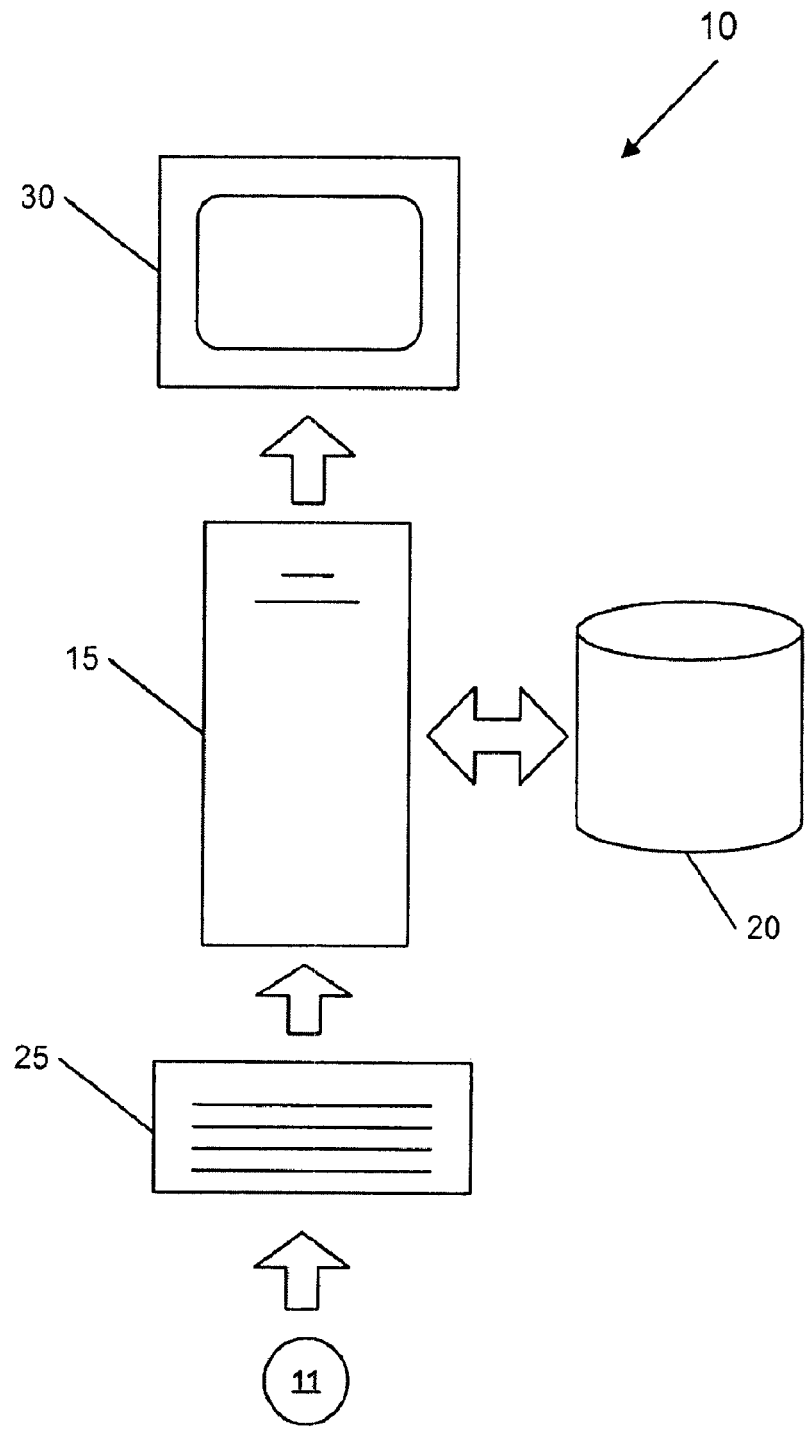
FIG. 1 is a block diagram illustrating an example flight management system supporting example embodiments of the present invention.

FIG. 1 is a block diagram illustrating a flight management system (FMS) 10 supporting example embodiments of the present invention. The FMS 10 includes a digital processor 15, a memory 20, a data entry device 25, and a display unit 30, such as a Multifunction Display (MFD) or monitor.

In operation, a user 11 (e.g., a pilot or navigator) enters a character(s) of a desired waypoint identifier into the FMS 10 via the data entry device 25. In response to the entered character(s), the FMS 10 searches a database of waypoint identifiers stored in the memory 20. The search is based in part on the character(s) entered by the user 11 and a geographical relationship between a geographical location of each waypoint identifier stored in the memory 20 and a location of a reference location or area (described in greater detail below). The result of the search is displayed back to the user 11 on the display 30.

FIG. 1 is merely an example illustration of a configuration supporting example embodiments of the present invention, and as such, one of ordinary skill in the art will readily recognize that other configurations are also contemplated. For example, the digital processor 15 and the memory 20 may be integrated onto a single integrated circuit. In another example, the data entry device 25 may be a keyboard, a keypad, a trackball, microphone, voice activated unit, or other input device known in the art. In yet another example, the display 30 may be a Primary Flight Display (PFD).

Figure 2A:
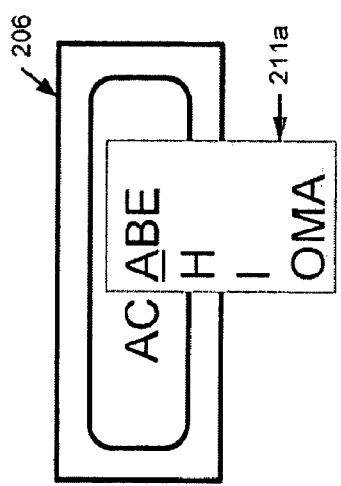
FIGS. 2A and 2B are block diagrams illustrating a comparison between filling an entry field with a desired waypoint identifier using an autofill technique and a GeoFill technique in accordance with example embodiments of the present invention.
Figure 2A:
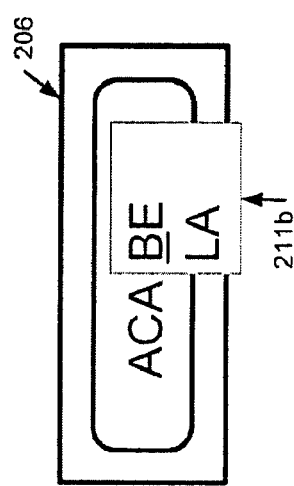
Figure 2A:
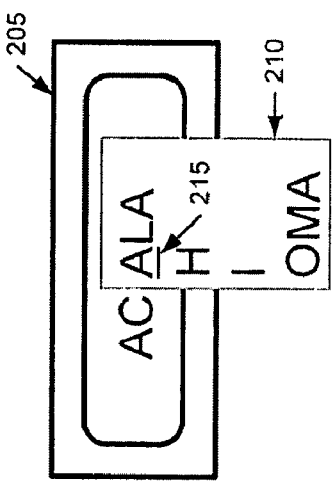

FIG. 2A illustrates a comparison between filling in or otherwise completing a first entry field 205 with a desired waypoint identifier "ACALA" using a technique according to embodiments of the present invention, hereinafter referred to as GeoFill, and filling in a second entry field 206 with the same desired waypoint identifier "ACALA" using an automatic complete text entry or autofill technique.

For this comparison, assume a database of waypoint identifiers includes (amongst others) waypoint identifiers "ACABE" and "ACALA." Also assume for this comparison the waypoint identifier "ACALA" is closer to a reference position then the waypoint identifier "ACABE." As will be described later, whether a waypoint identifier is "close" or "geographically close" to a reference position or not, may be determined by whether the distance between the waypoint identifier and the reference position is within a vicinity term. Continuing with this example, a search string "AC" 207a is used to search the database of waypoint identifiers for the desired waypoint identifier "ACALA."

Using an example autofill technique, the database is searched for waypoint identifiers beginning with the search string "AC" 207a. However, not every occurrence of the search string "AC" 207a found is returned using the autofill technique. Rather, for each character in a set of characters (e.g., A-Z), autofill returns a first occurrence of the search string followed by a character from the set of characters. As such, an autofill list 211a is populated, with a first waypoint identifier beginning with "AC" followed by "A," a first waypoint identifier beginning with "AC" followed by "B," and so on.

Because the autofill list 211a is populated only with the first occurrence of the search string "AC" 207a followed by a character from a set of characters and "ACABE" is the first occurrence of the search string "AC" 207a followed by "A," the second entry field 206 is filled in with "ACABE," rather than the desired waypoint identifier "ACALA." To fill in the second entry field 206 with the desired waypoint identifier "ACALA," an additional character must be added to the search string "AC" 207a. In other words, the autofill technique requires entering in an additional character.

The database of waypoint identifiers is now searched with a "longer" search string "ACA" 207b. As before, a resulting autofill list 211b is populated with a first waypoint identifier beginning with "ACA" followed by "A," a first waypoint identifier beginning with "ACA" followed by "B," and so on. Because the autofill list 211*b* is populated with the first occurrence of the search string "ACA" 207*b* followed by a character from a set of characters and "ACALA" is a first single occurrence of the search string "ACA" 207*b* followed by "L," the second entry field 206 can now be filled in with the desired waypoint identifier.

Another example autofill technique selects the most likely text identifier by comparing entered characters typed against those corresponding sequential text identifiers previously stored within a database. That is, after entering a first character and locating a first waypoint identifier with the first entered character, a second waypoint identifier with a second entered character is located by comparing the entered second character with the next waypoint identifier in sequence. In this way, this autofill technique uses a search criterion which is based on a pre-existing ordering, namely, the sequential ordering of waypoint identifiers in the database. Pre-existing orderings are typically alphabetical or alphanumerical or other sequential ordering.

The distinction between the two autofill techniques described above is illustrated by considering the following example. A database of waypoint identifiers includes the following waypoint identifiers in the following order: "HBSR1," "HBSR2," and "HBSR3." Using a search string "HBSR" and a character from a set of characters (e.g., the numeral "2") the first autofill technique returns "HBSR2," which is the second waypoint identifier, as ordered in the database of waypoint identifiers. Using the same search string "HBSR," the second autofill technique compares in sequence the entered characters "HBSR" with the waypoint identifiers stored within the database. Because "HBSR1" is before "HBSR2" and "HBSR3" in sequence, the second autofill technique returns the "HBSR1," not "HBSR2" or "HBSR3."

The second autofill technique is further distinguished from the first autofill technique. Unlike the first described autofill technique, which uses a search string followed by a character from a set of characters (i.e., a concatenated search string) to search, the second autofill technique relies solely on a search string. Consequently, the second autofill technique requires at least one character to be entered.

In contrast to either autofill techniques described above, the GeoFill technique uses a search criterion not based on a pre-existing ordering, such as alphanumerical ordering or sequential ordering of waypoint identifiers previously stored within a database. Rather, GeoFill uses, as a search criterion, a geographical relationship between a location of a waypoint identifier and a reference position or area. In this way, GeoFill returns for each character in a set of characters, a closest single occurrence of a search string followed by a character from the set of characters (described in greater detail below).

An assumption is made that the desired waypoint identifier is in a vicinity of a reference position. However, a priori knowledge of the reference position (e.g., designating a reference position in a flight plan) is not required. For example, a reference position may be continuously updated. In this way, it may be further assumed that the desired waypoint identifier is in a vicinity of a current (sensed or calculated) reference position. Furthermore, the reference position need not lie in a general direction of a destination. For example, a change in events may necessitate a deviation and require travel not in a general direction of a destination. In this way, GeoFill is not the same as identifying a most likely waypoint identifier that is geographically closest to, for example, a previous flight plane waypoint identifier or a waypoint identifier which lies in a general direction of a destination.

Continuing with FIG. 2A, because a GeoFill list 210 is populated with a closest waypoint identifier beginning with the search string "AC" 207*a* followed by a character from a set of characters and "ACALA" is the closest occurrence of the search string "AC" 207*a* followed by "A," the first entry field 205 is filled in with the desired waypoint identifier.

As FIG. 2A illustrates, filling in an entry field with a desired waypoint identifier using the autofill technique may require entering a "longer" search string than using GeoFill. As such, filling in an entry field with a desired waypoint identifier using the autofill technique may require more time (or user steps) than using GeoFill.

Figure 2B:
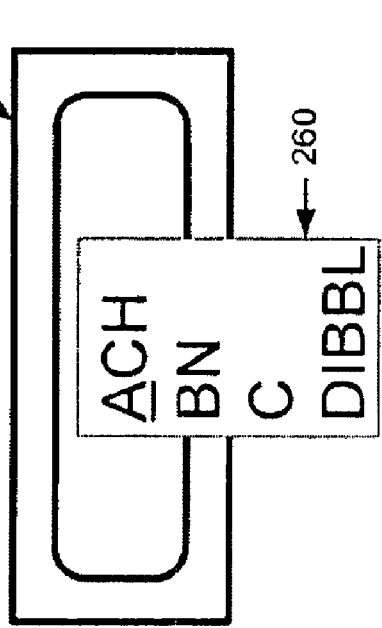

FIG. 2B illustrates using GeoFill to fill in an entry field 255 with a desired waypoint identifier based on an entry of no characters, i.e., a NULL search string 257. As an illustration, given a set of characters "A-Z," a GeoFill list 260 is populated with a geographically closest occurrence of a waypoint identifier with "A," a geographically closest occurrence of a waypoint identifier with "B," and so on. In this way, GeoFill is not the same as presenting likely text identifiers based on entry of a character of a text identifier for comparison and auto completion of the identifier.

Continuing with the example illustrated in FIG. 2B, using the NULL search string 257, GeoFill returns for each character in a set of characters, a geographically closest occurrence of a waypoint identifier formed of the NULL search string 257 followed by a character from the set of characters. Because a GeoFill list 260 is populated with a geographically closest waypoint identifier beginning with the NULL search string 257 followed by a character from a set of characters and "ACALA" is the geographically closest occurrence of a waypoint identifier having the NULL search string 257 followed by "A," the entry field 255 is filled in with the desired waypoint identifier.

FIGS. 2A and 2B illustrate the listing of waypoint identifiers (e.g., 210, 211*a-b*, and 260) as a display element capable of presenting multiple lines simultaneously. One skilled in the art, however, will readily recognize there may be alternative ways to display a listing of candidate waypoint identifiers. For example, a single-lined display element with scroll feature may be used. Additionally, a cursor (e.g., 215) indicates a character in the subject search string to be changed. In another example embodiment, a highlight (or highlighting) may be used to indicate a character to be changed. Moreover, the MFD 30 (of FIG. 1) may affect a manner in which an entry field and a listing of waypoint identifiers are displayed. These alternatives are within the contemplation of example embodiments of the invention.

For purposes of illustrating and describing principles and concepts of the present invention, example embodiments are illustrated and described as processing and producing "lists." This is merely a convenient way for illustrating and describing the principles of the present invention and is not intended to limit embodiments of the present invention to list.

Figure 3A:
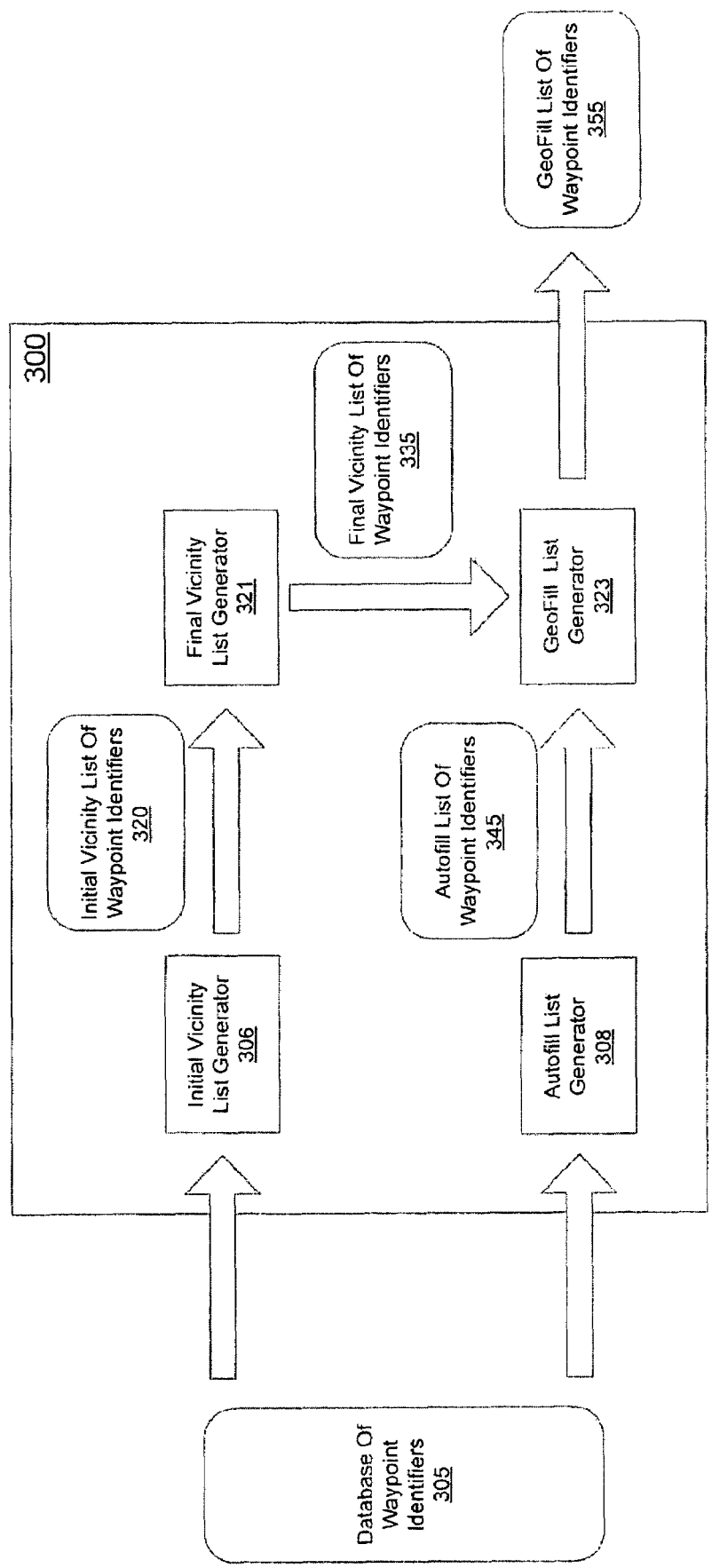
FIGS. 3A-E are block diagrams illustrating example apparatuses to generate an initial vicinity list, a final vicinity list, an autofill list, and a GeoFill list of waypoint identifiers in accordance with example embodiments of the present invention.

FIG. 3A illustrates an example apparatus 300 to fill in an entry field (e.g., 205 of FIG. 2A) with a desired waypoint identifier. In brief overview, the example apparatus 300, from database waypoint identifiers 305, generates a GeoFill list of candidate waypoint identifiers 355. The GeoFill list of candidate waypoint identifiers 355 is used to fill in the entry field with the desired waypoint identifier.

In further detail, from the database of waypoint identifiers 305, an initial vicinity list generator 306 generates an initial vicinity list of waypoint identifiers 320. From the generated initial vicinity list of waypoint identifiers 320, a final vicinity list generator 321 (being coupled to or otherwise responsive to the initial vicinity list generator 306) generates a final vicinity list of waypoint identifiers 335.

Also from the database of waypoint identifiers 305, an autofill list generator 308 generates an autofill list of waypoint identifiers 345. From the generated final vicinity list of waypoint identifiers 335 and the generated autofill list of waypoint identifiers 345, a GeoFill list generator 323 (being coupled to or otherwise responsive to both the final vicinity list generator 321 and the autofill list generator 308) generates the GeoFill list of waypoint identifiers 355.

Having provided an overview, further details of the initial vicinity list generator 306, the autofill list generator 308, the final vicinity list generator 321, and the GeoFill list generator 323 are provided below in reference to FIGS. 3B-3E.

FIGS. 3B-3E illustrate in greater detail filling in an entry field (e.g., 205 of FIG. 2A) with a desired waypoint identifier using a reference position "ACALA" 310 and a search string "AC" 325. More particularly, the database of waypoint identifiers 305 is searched for waypoint identifiers which are "geographically close" to the reference position "ACALA" 310 and begin with the search string "AC" 325.

Figure 3B:
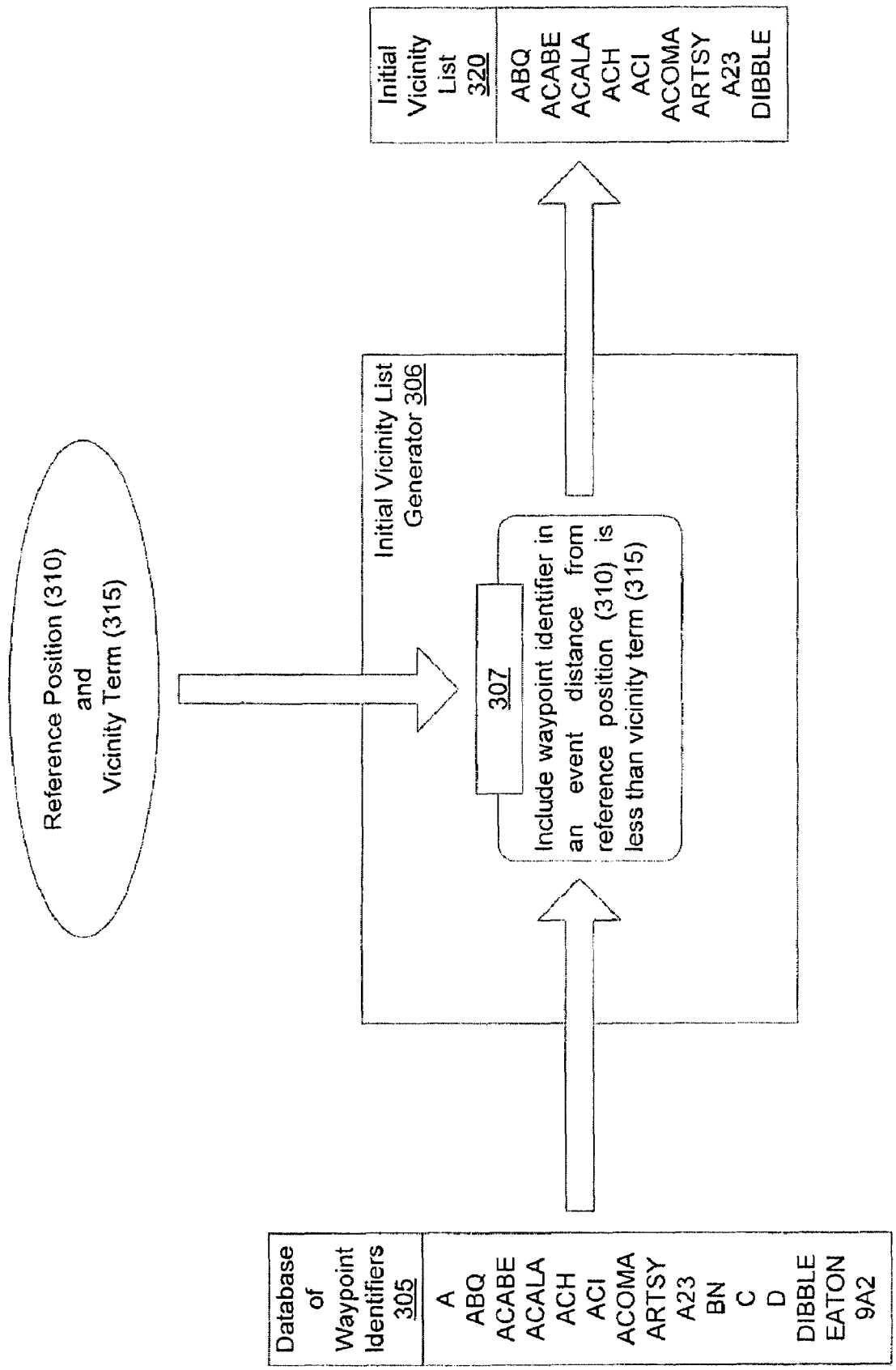

In FIG. 3B, from the database of waypoint identifiers 305, the initial vicinity list generator 306 generates the initial vicinity list 320. The initial vicinity list generator 306 includes a logic unit 307 to include a waypoint identifier from the database of waypoint identifiers 305 in an event the distance between the waypoint identifier and the reference position "ACALA" 310 is within or is otherwise less than or equal to a vicinity term 315. As such, the generated initial vicinity list 320 is populated with waypoint identifiers from the database of waypoint identifiers 305 whose distance from the reference position "ACALA" 310 are within the vicinity term 315. In contrast, waypoint identifiers from the database of waypoint identifiers 305 whose distance from the reference position "ACALA" 310 are not within or otherwise greater than the vicinity term 315 are not included in the generated initial vicinity list 320. In this way, a "geographically close" or "geographically closest" waypoint identifier to a reference position is determined by whether the distance between the waypoint identifier and the reference position is within a vicinity term.

Figure 3C:
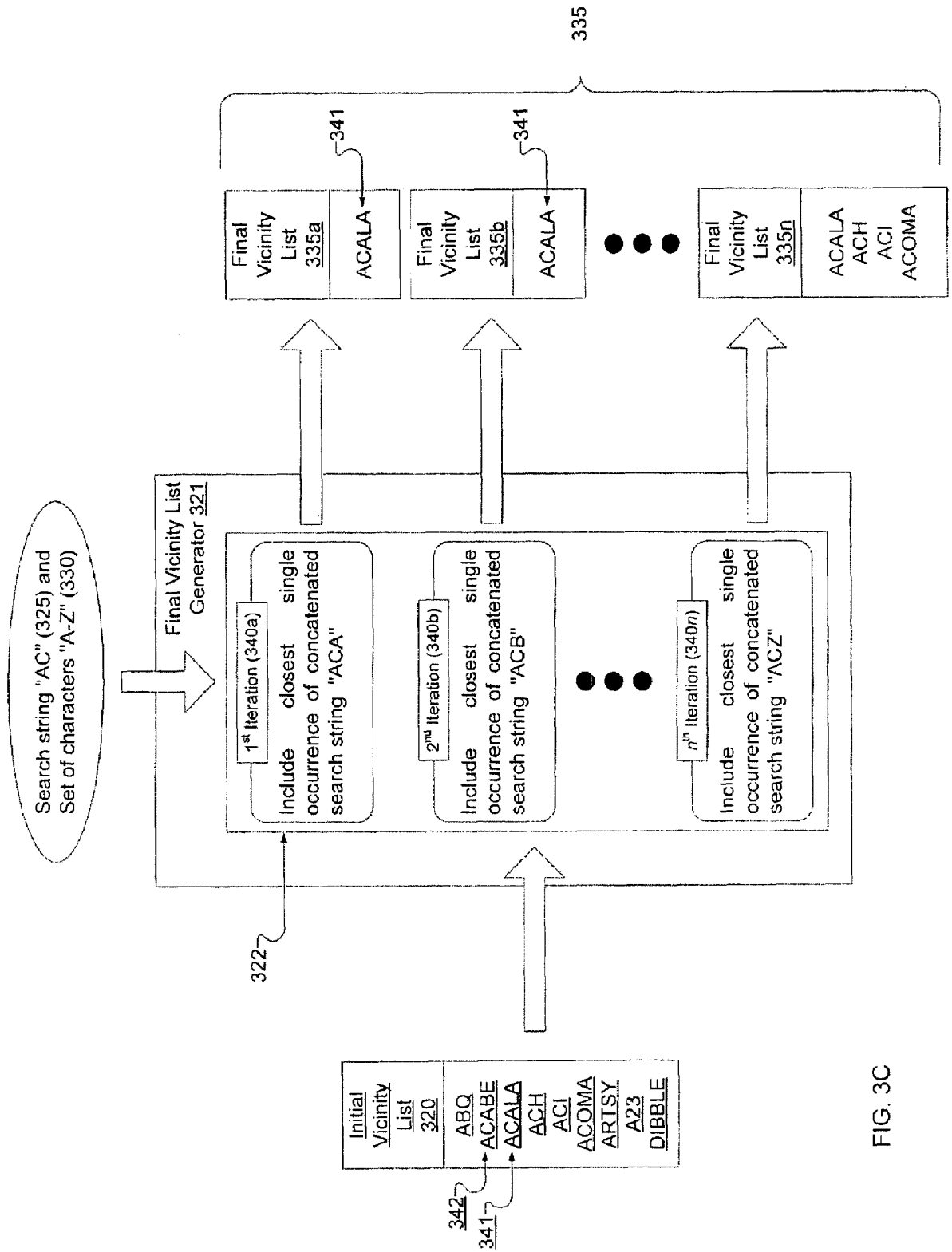

In FIG. 3C, from the initial vicinity list 320, the final vicinity list generator 321 generates the final vicinity list 335. The final vicinity list generator 321 includes a logic unit 322 to include waypoint identifiers from the initial vicinity list 320 as described below.

A search string is concatenated with a character from a set of characters to form a concatenated search string. For example a NULL search string (i.e., a search string with zero characters) is concatenated with a character from a set of characters "A" through "Z," to form concatenated search strings "A," "B," "C," and so on. In another example, a search string "1" is concatenated with a character from a set of characters "A" through "Z," to form concatenated search strings "1A," "1B." "1C," and so on.

Continuing with FIG. 3C, the search string "AC" 325 is concatenated with characters from the set of characters "A-Z" 330 to form concatenated search strings "ACA," "ACB," "ACC," and so on. The logic unit 322 includes waypoints identifiers beginning with these concatenated search strings. However, the logic unit 322 does not include every waypoint identifier beginning with the concatenated search strings. That is, not every occurrence of the concatenated search strings is included. While there may be more than one occurrence of any given concatenated search string, the logic unit 322 includes from the initial vicinity list 320, one or otherwise a single occurrence of each concatenated search string.

Because the initial vicinity list 320 itself includes waypoint identifiers whose distances to the reference position 310 are within the vicinity term 315, the logic unit 322 may be said to include a waypoint identifier which is the closest single occurrence of a concatenated search string. In this way, the generated final vicinity list 335 is populated with waypoint identifiers whose distance from the reference position "ACALA" 310 are within the vicinity term 315, and are single occurrences of the search string "AC" 325 concatenated with characters from the set of characters "A-Z" 330. The following example illustrates the above in greater detail.

In a first iteration 340a, the initial vicinity list of waypoint identifiers 320 is searched for a geographically closest single occurrence of a concatenated search string "ACA" (formed from concatenating the search string "AC" 325 with a character "A" from the set of characters "A-Z" 330). In the initial vicinity list of waypoint identifiers 320, there are multiple occurrences of the concatenated search string "ACA," namely, a waypoint identifier "ACALA" 341 and a waypoint identifier "ACABE" 342. The subject or working reference position "ACALA" 310, however, is geographically closer to the waypoint identifier "ACALA" 341, than to the waypoint identifier "ACABE" 342. Accordingly, the closest single occurrence of the concatenated search string "ACA" is the waypoint identifier "ACALA" 341. After the first iteration 340a, a final vicinity list of waypoint identifiers 335a includes the waypoint identifier "ACALA" 341, but not the waypoint identifier "ACABE" 342.

In another example embodiment, a final vicinity list of waypoint identifiers 335 includes a preferred single occurrence of a concatenated search string. In contrast, to a geographically closest single occurrence of a concatenated search string described above, if a waypoint identifier is preferred or is otherwise a preferred navaid, it is included in the final vicinity list of waypoint identifiers 335, while a waypoint identifier which is closest to a reference position is not. For example, if the waypoint identifier "ACABE" 342 is a preferred navaid, it is included in the final vicinity list of waypoint identifiers 335 despite the waypoint identifier "ACALA" 341 being geographically closest to the reference position "ACALA" 310.

In a second iteration 340b, the initial vicinity list of waypoint identifiers 320 is searched for a geographically closest single occurrence of a concatenated search string "ACB" (formed from concatenating the search string "AC" 325 with a character "B" from the set of characters "A-Z" 330). There are no occurrences of the concatenated search string "ACB" in the initial vicinity list of waypoint identifiers 320. Consequently, after the second iteration 340b, a final vicinity list of waypoint identifiers 335b includes the waypoint identifier "ACALA" 341 (from the first iteration 340a).

Subsequent iterations are likewise performed. After an nth iteration 340n, a final vicinity list of waypoint identifiers 335n includes a geographically closest single occurrence for each concatenated search string.

Figure 3D:
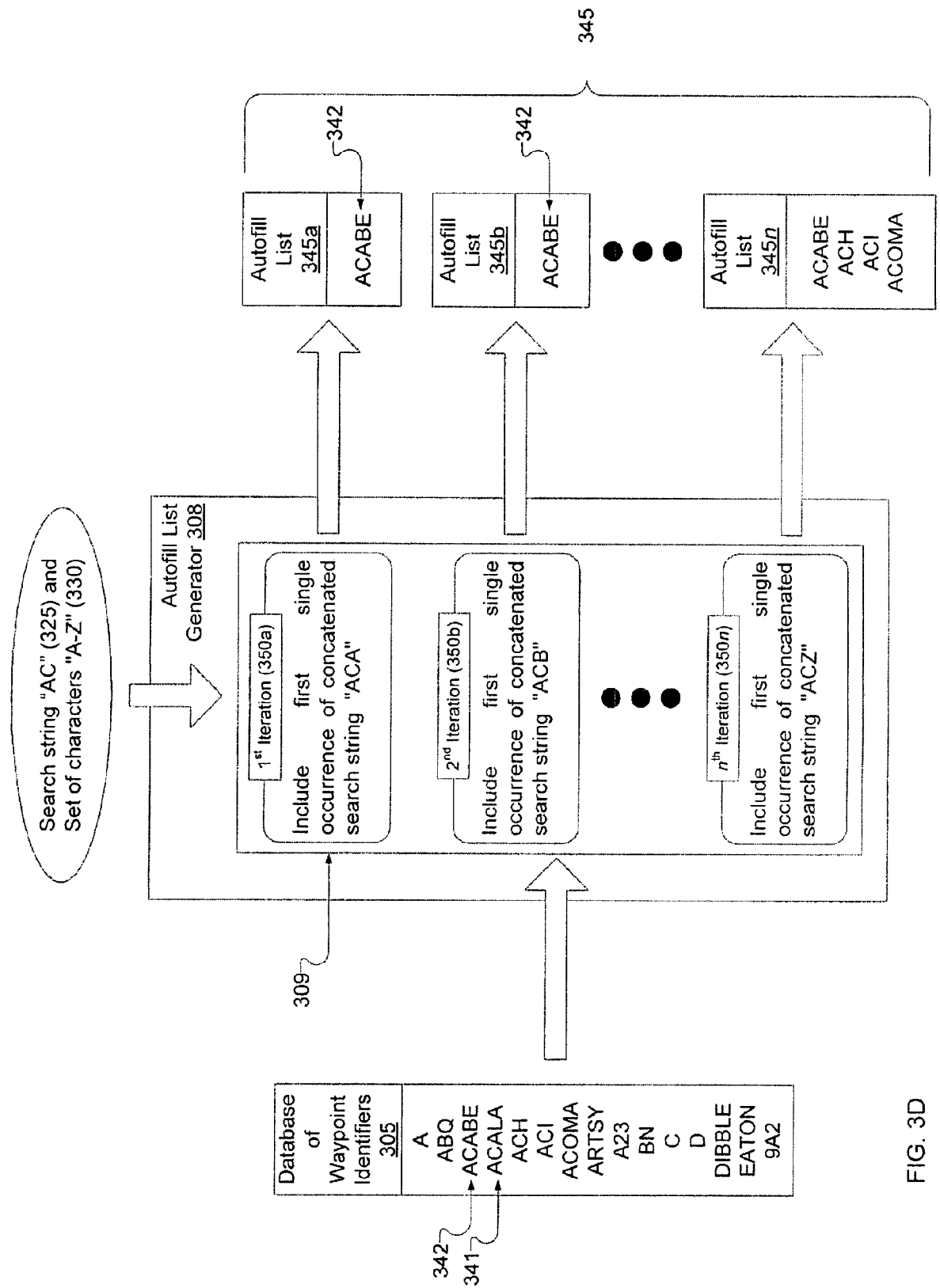

In FIG. 3D, from the database of waypoint identifiers 305, the autofill list generator 308 generates the autofill list 345. The autofill list generator 308 includes a logic unit 309 to include a waypoint identifier from the database of waypoint identifiers 305 as described below.

Similar to generating the final vicinity list of waypoint identifiers 335, described above, the search string "AC" 325 is concatenated with characters from the set of characters "A-Z" 330 to form concatenated search strings. The concatenated search strings are used to search the database of waypoint identifiers 305. Again, not every occurrence of each concatenated search string is included in the generated autofill list of waypoint identifiers 345. While there may be more than one occurrence of any given concatenated search string, the logic unit 309 includes a first single occurrence of each concatenated search string. The first single occurrence of each concatenated search string may be first in terms of, for example, alphanumerical ordering, an ordering in the database of waypoint identifiers 305, or other ordering. In this way, the generated autofill list of waypoint identifiers 345 is populated with the first single occurrence of the search string "AC" 325 followed by a character from the set of characters "A-Z" 330. The following example illustrates the above in greater detail.

In a first iteration 350*a*, the database of waypoint identifiers 305 is searched for a first single occurrence of a concatenated search string "ACA" (formed from concatenating the search string "AC" 325 with a character "A" from the set of characters "A-Z" 330). In the database of waypoint identifiers 305 there are multiple occurrences of the concatenated search string "ACA," namely, the waypoint identifier "ACALA" 341 and the waypoint identifier "ACABE" 342. In the database of waypoint identifiers 305, the waypoint identifier "ACALA" 341 is preceded by the waypoint identifier "ACABE" 342. As such, the first single occurrence of the concatenated search string "ACA" is the waypoint identifier "ACABE" 342. After the first iteration 350*a*, an autofill list of waypoint identifiers 345*a* includes the waypoint identifier "ACABE" 342, but not the waypoint identifier "ACALA" 341.

In the above example embodiment, the autofill list of waypoint identifiers 345 includes a first single occurrence of each concatenated search string. Alternatively, an included single occurrence may not be first, but may be, for example, last or preferred. One skilled in the art will readily recognize these and other alternatives are all within the contemplation of the invention.

Continuing with FIG. 3D, in a second iteration 350*b*, the database of waypoint identifiers 305 is searched for a first single occurrence of a concatenated search string "ACB" (formed from concatenating the search string "AC" 325 with a character "B" from the set of characters "A-Z" 330). There are no occurrences of the concatenated search string "ACB" in the database of waypoint identifiers 305. Consequently, after the second iteration 350*b*, an autofill list of waypoint identifiers 345*b* includes the waypoint identifier "ACABE" 342 (from the first iteration 350*a*).

Subsequent iterations are likewise performed. After an nth iteration 350*n*, an autofill list of waypoint identifiers 345*n* includes a first single occurrence for each concatenated search string.

Figure 3E:
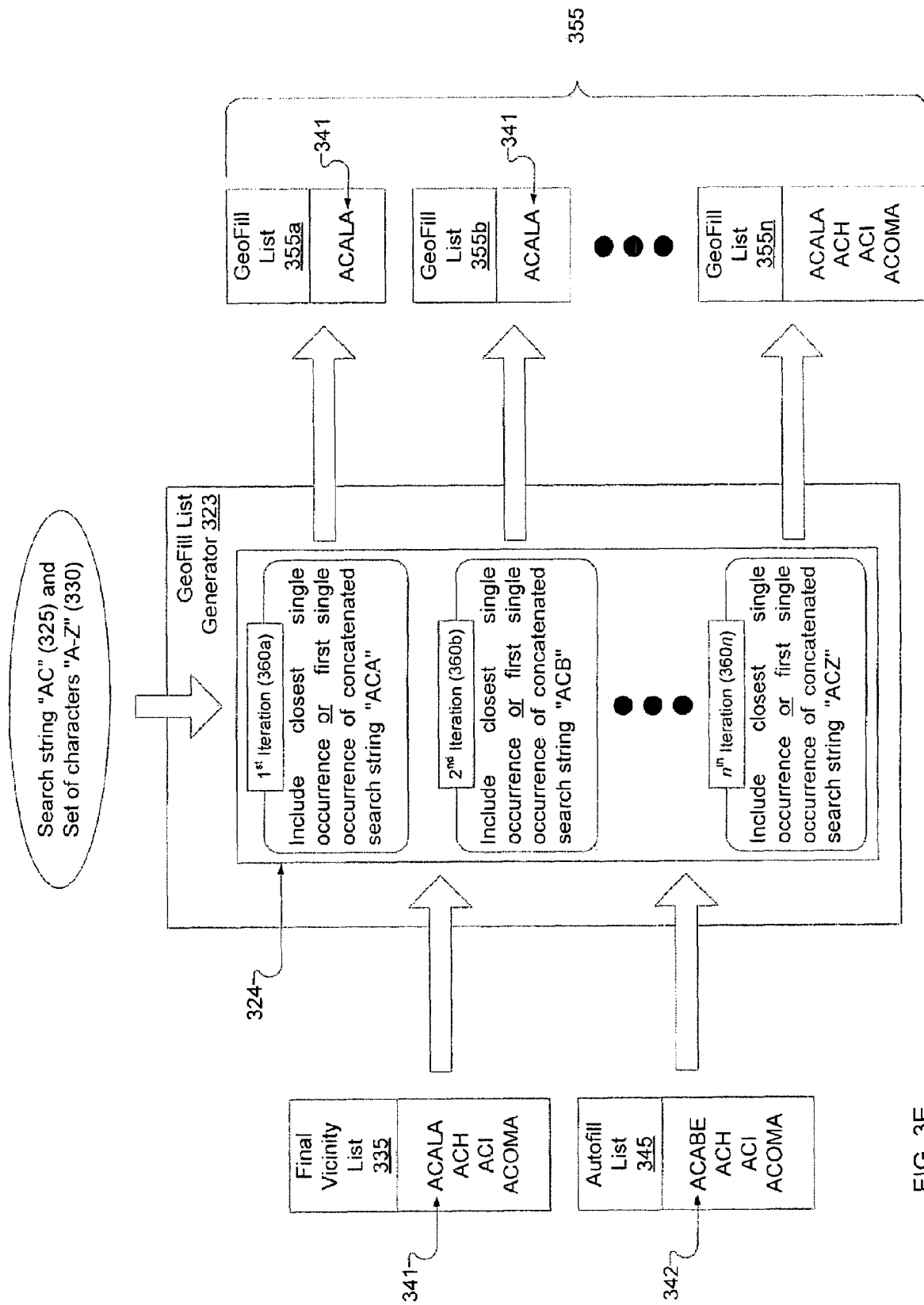

In FIG. 3E, from the final vicinity list 335 and the autofill list 345, the GeoFill list generator 323 generates the GeoFill list 355. The GeoFill list generator 323 includes a logic unit 324 to include a waypoint identifier either from the final vicinity list 335 and the autofill list 345 as described below.

Similar to generating the autofill list of waypoint identifiers 335, described above, the search string "AC" 325 is concatenated with characters from the set of characters "A-Z" 330 to form concatenated search strings. The concatenated search strings are used to search the final vicinity list 335. If a concatenated search string occurs in the final vicinity list 335, the logic unit 324 includes the occurrence (i.e., a waypoint identifier beginning with the concatenated search string) from the final vicinity list 335. In this instance, the GeoFill list of waypoint identifiers 355 is populated with a geographically closest single occurrence of the concatenated search string. Recall, a "geographically close" or "geographically closest" waypoint identifier to a reference position is determined by whether the distance between the waypoint identifier and the reference position is within a vicinity term.

If, however, the concatenated search string does not occur in the final vicinity list of waypoint identifiers 335, but does occur in the autofill list of waypoint identifiers 345, the logic unit 324 includes the occurrence from the autofill list of waypoint identifiers 345. In this instance, the GeoFill list of waypoint identifiers 355 is populated with a first single occurrence of a concatenated search string. In this way, the GeoFill list of waypoint identifiers 355 may be populated with both the geographically closest and the first single occurrences of the search string "AC" 325 followed by a character from the set of characters "A-Z" 330.

If such an occurrence is neither found in the final vicinity list of waypoint identifiers 335 nor in the autofill list of waypoint identifiers 345, then no waypoint identifier is included in the GeoFill of waypoint identifiers 355.

In one embodiment, if an occurrence of a concatenated search string is found in both the final vicinity list 335 and the autofill list of waypoint identifiers 345, the logic unit 324 includes the occurrence from the final vicinity list 335 rather then from the autofill list 345. In this way, the logic unit 324 may be said to prefer a waypoint identifier from the final vicinity list 335 over a waypoint identifier from the autofill list 345. However, as described above, in an event the concatenated search string does not occur in the final vicinity list of waypoint identifiers 335, but does occur in the autofill list of waypoint identifiers 345, the logic unit 324 includes the occurrence from the autofill list of waypoint identifiers 345. As such, the GeoFill list of waypoint identifiers 355 may be preferably populated with the closest single occurrences of the search string "AC" 325 followed by a character from the set of characters "A-Z" 330. The following example illustrates the above in greater detail.

In a first iteration 360*a*, the final vicinity list of waypoint identifiers 335 is searched for an occurrence of a concatenated search string "ACA" (formed from concatenating the search string "AC" 325 with a character "A" from the set of characters "A-Z" 330). The occurrence of the concatenated search string "ACA" is found, namely, the waypoint identifier "ACALA" 341. Accordingly, after the first iteration 360*a*, the waypoint identifier "ACALA" 341 (a geographically closest single occurrence of the concatenated search string "ACA") populates a GeoFill list of waypoint identifiers 355*a*.

Note there is another occurrence of the concatenated search string "ACA," namely the waypoint identifier "ACABE" 342 from the autofill list of waypoint identifiers 345. This waypoint identifier is not included in the GeoFill list of waypoint identifiers 355 because the occurrence of the concatenated search string "ACA" is already found in the final vicinity list of waypoint identifiers 335. As such, it may be said there is a bias or preference for including waypoint identifiers which are geographically closest single occurrences of concatenated search strings.

In a second iteration 360*b*, the final vicinity list of waypoint identifiers 335 is searched for an occurrence of a concatenated search string "ACB" (formed from concatenating the search string "AC" 325 with a character "B" from the set of characters "A-Z" 330). There is no occurrence of the concatenated search string "ACB" in the final vicinity list of waypoint identifiers 335. Subsequently, the autofill list of waypoint identifiers 345 is also searched for an occurrence of the concatenated search string "ACB." Likewise, there is no occurrence of the concatenated search string "ACB" in the autofill list of waypoint identifiers 345. Consequently, after the second iteration 360*b*, a GeoFill list of waypoint identifiers 355*b* includes the waypoint identifier "ACALA" 341 (from the first iteration 360*a*).

Subsequent iterations are likewise performed. After an nth iteration 350n, GeoFill list of waypoint identifiers 355n includes an occurrence for each concatenated search string. Each occurrence of a given concatenated search string may be a geographically closest single occurrence or a first single occurrence, as described above in iterations 360a and 360b.

Waypoint identifiers from the generated GeoFill list of waypoint identifiers 355 are subsequently used to fill in an entry field (e.g., the entry field 205 of FIG. 2A). Accordingly, the entry field is filled in with waypoint identifiers which begin with a search string followed by a character from a set of characters, and which are either closest to a reference position or if not closest geographically, then a first occurrence in a database of waypoint identifiers.

While FIGS. 3A-3F illustrate and corresponding text describes example embodiments of the present invention in reference to lists, one skilled in the art will readily recognize that such references are merely for convenience. Furthermore, principles of the present invention are not intended to be limited to lists, but are applicable to other forms of collections of data, such as sets (ordered and unordered).

Figure 4:
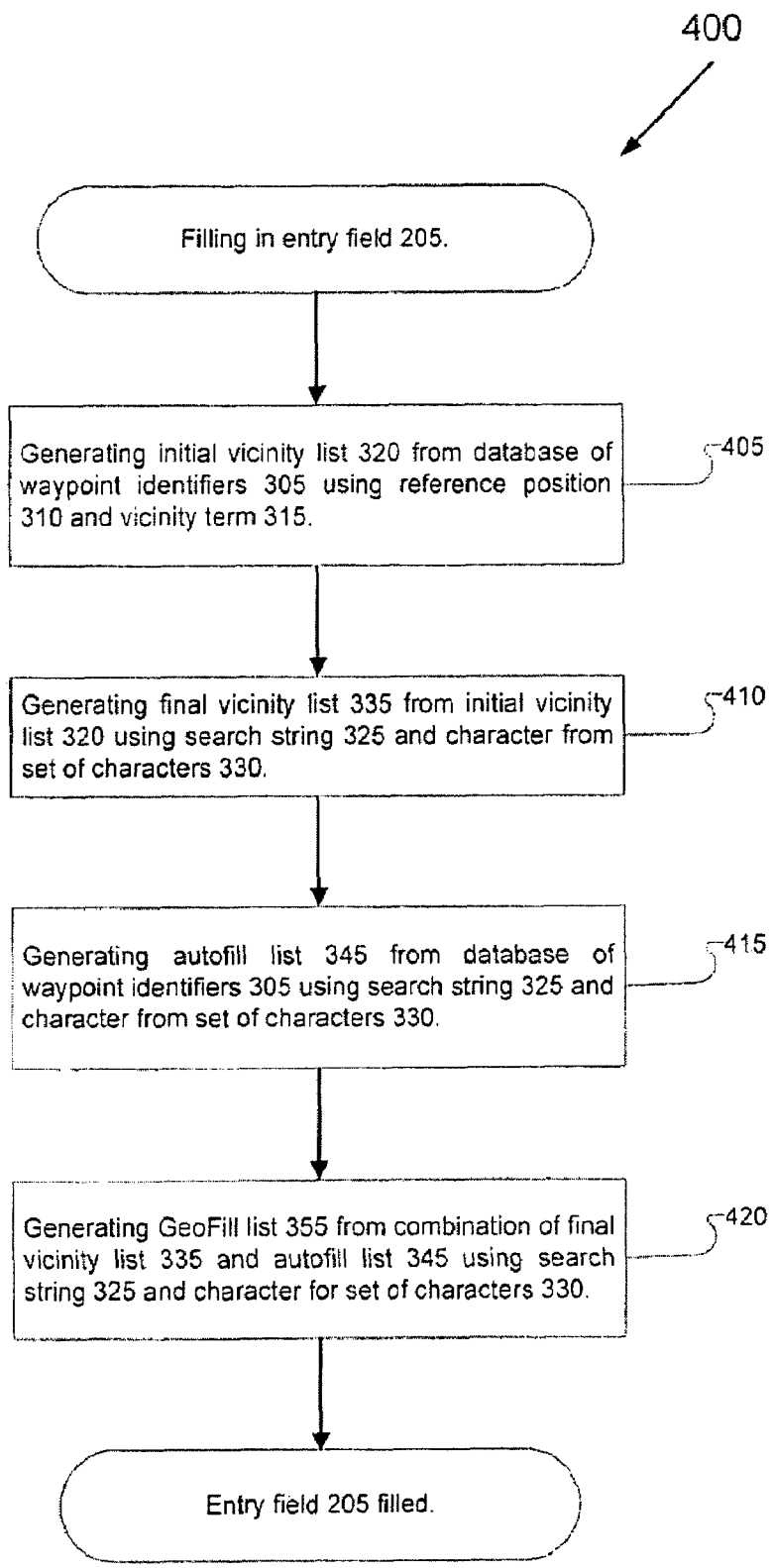
FIG. 4 is a flow chart of an example process for filling in an entry field in accordance with an example embodiment of the present invention.

FIG. 4 is a flow diagram illustrating an example invention process 400 for filling in an entry field (e.g., 205 of FIG. 2A) with a desired waypoint identifier. An initial vicinity list of waypoint identifiers (e.g., 320 of FIGS. 3A and 3B) is generated (405) from a database of waypoint identifiers (e.g., 305 of FIG. 3A) using a reference position (e.g., 310 of FIG. 3B) and a vicinity term (e.g., 315 of FIG. 3B).

A final vicinity list of waypoint identifiers (e.g., 335 of FIG. 3C) is generated (410) from the initial vicinity list of waypoint identifiers (generated at 405) using a search string (e.g., 325 of FIG. 3C) and a character from a set of characters (e.g., 330 of FIG. 3C).

An autofill list of waypoint identifiers (e.g., 345 of FIG. 3D) is generated (415) from the database of waypoint identifiers using the search string and a character from the set of characters.

A GeoFill list of waypoint identifiers (e.g., 355 of FIG. 3D) is generated (420) from a combination of both the final vicinity list of waypoint identifiers (generated at 410) and the autofill list of waypoint identifiers (generated at 415) using the search string and a character from the set of characters.

Waypoint identifiers from the resulting GeoFill list are used to fill in the entry field with the desired waypoint identifier.

Figure 5:
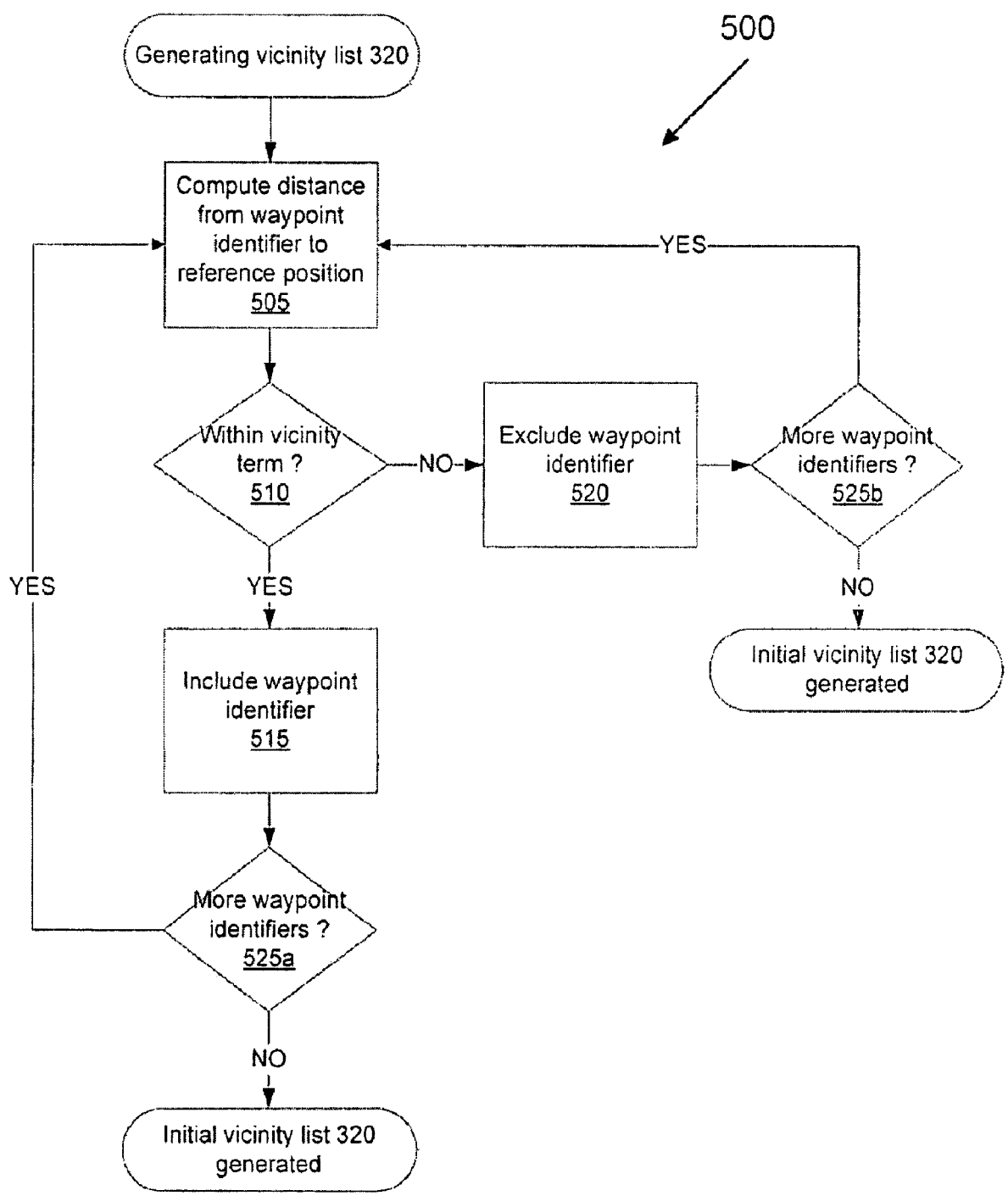
FIG. 5 is a flow chart of example process for generating an initial vicinity list of waypoint identifiers in accordance with an example embodiment of the present invention.

FIG. 5 is a flow diagram illustrating an example process 500 for generating an initial vicinity list of waypoint identifiers (e.g., 320 of FIG. 3B) from a database of waypoint identifiers (e.g., 305 of FIG. 3B) using a reference position (e.g., 310 of FIG. 3B) and a vicinity term (e.g., 315 of FIG. 3B). A distance between a waypoint identifier from the database of waypoint identifiers 305 and the reference position 310 is computed (505). If at 510 the computed distance is within (e.g., less than or equal to) the vicinity term 315, the waypoint identifier is included (515) in the initial vicinity list of waypoint identifiers 320. If, however, at 510 the computed distance is not within (e.g., greater than) the vicinity term 315, the waypoint identifier is excluded (520) from the initial vicinity list of waypoint identifiers 320.

If there are more waypoint identifiers (525a and 525b) in the database of waypoint identifiers 305, the process 500 returns to compute (505) a distance between a next waypoint identifier and the reference position 310. Consequently, the generated initial vicinity list of waypoint identifier 320 includes waypoint identifiers within (or otherwise less than or equal to) the vicinity term 315, and does not include waypoint identifiers not within (or otherwise greater than) the vicinity term 315.

In an example embodiment, the vicinity term 315 used to include and exclude waypoint identifiers from the initial vicinity list of waypoint identifiers 320 is defined by a user, such as a pilot of an aircraft. The user may define the vicinity term 315 to be small, and thereby limit the included waypoint identifiers to waypoint identifiers which are geographically closer to the reference position 310. Alternatively, the user may define the vicinity term 315 to be relatively large, and thereby expand the included waypoint identifiers to waypoint identifiers which are geographically further from the reference position 310. In this way, the user may determine which waypoint identifiers are included and which are excluded from the initial vicinity list of waypoint identifiers 320 generated by the process 500.

In another example embodiment, the vicinity term 315 used to include and exclude waypoint identifiers from the initial vicinity list of waypoint identifiers 320 is defined in response to the size of the generated initial vicinity list of waypoint identifiers 320. That is, the vicinity term 315 is increased, causing the process 500 to include more waypoint identifiers if the initial vicinity list of waypoint identifiers 320 would otherwise be small in number. Conversely, the vicinity term 315 is decreased if the initial vicinity list of waypoint identifiers 320 would otherwise be large in number. In yet another example embodiment, the vicinity term 315 is defined by an application, such as Federal Aviation Administration (FAA) regulations, particular flight procedures or particular flight conditions.

Figure 6:
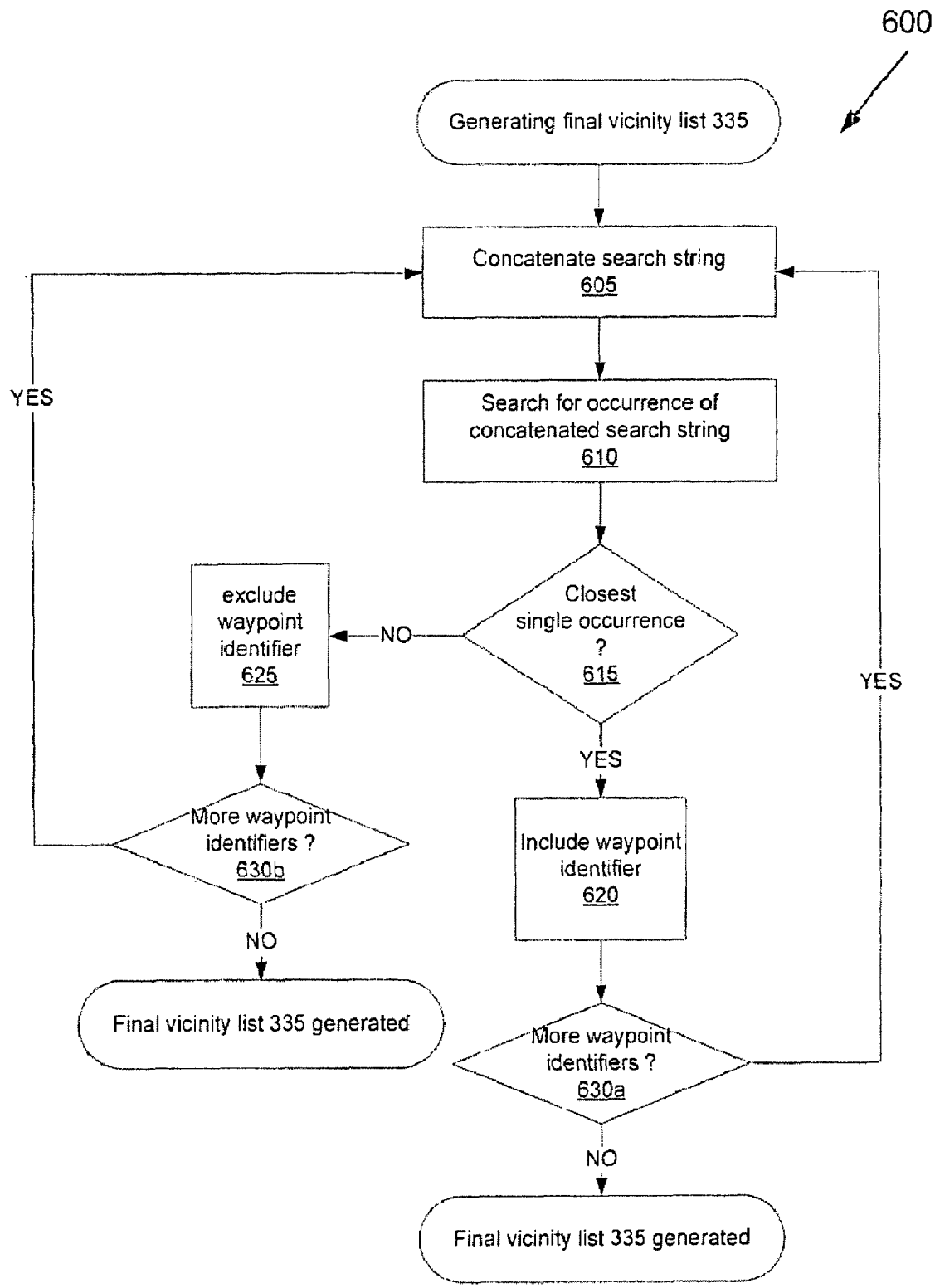
FIG. 6 is a flow chart of an example process for generating a final vicinity list of waypoint identifiers in accordance with an example embodiment of the present invention.

FIG. 6 is a flow diagram illustrating an example process 600 for generating a final vicinity list of waypoint identifiers (e.g., 335 of FIG. 3C) from an initial vicinity list of waypoint identifiers (e.g., 320 of FIG. 3C) using a search string (e.g., 325 of FIG. 3C) and a character from a set of characters (e.g., 330 of FIG. 3C). The search string 325 is concatenated (605) with a character from the set of characters 330 to form a concatenated search string.

The initial vicinity list of waypoint identifiers 320 is searched (610) for an occurrence of the concatenated search string. If a closest single occurrence of the concatenated search string is found (615) (i.e., a waypoint identifier beginning with the concatenated search string and is geographically closest to the reference position 310) the waypoint identifier is included (620) in the final vicinity list of waypoint identifiers 335. If, however, a closest single occurrence is not found, the waypoint identifier is excluded (625) from the final vicinity list of waypoint identifiers 335.

After including the waypoint identifier (620) or excluding the waypoint identifier (625) from the final vicinity list of waypoint identifiers 335, if there are more waypoint identifiers (630a and 630b) in the initial vicinity list of waypoint identifiers 320, the process 600 returns to concatenate (605) the search string 325 with a next character from the set of characters 330. Consequently, the final vicinity list of waypoint identifiers 335 includes a geographically closest single occurrence for each concatenated search string.

Figure 7:
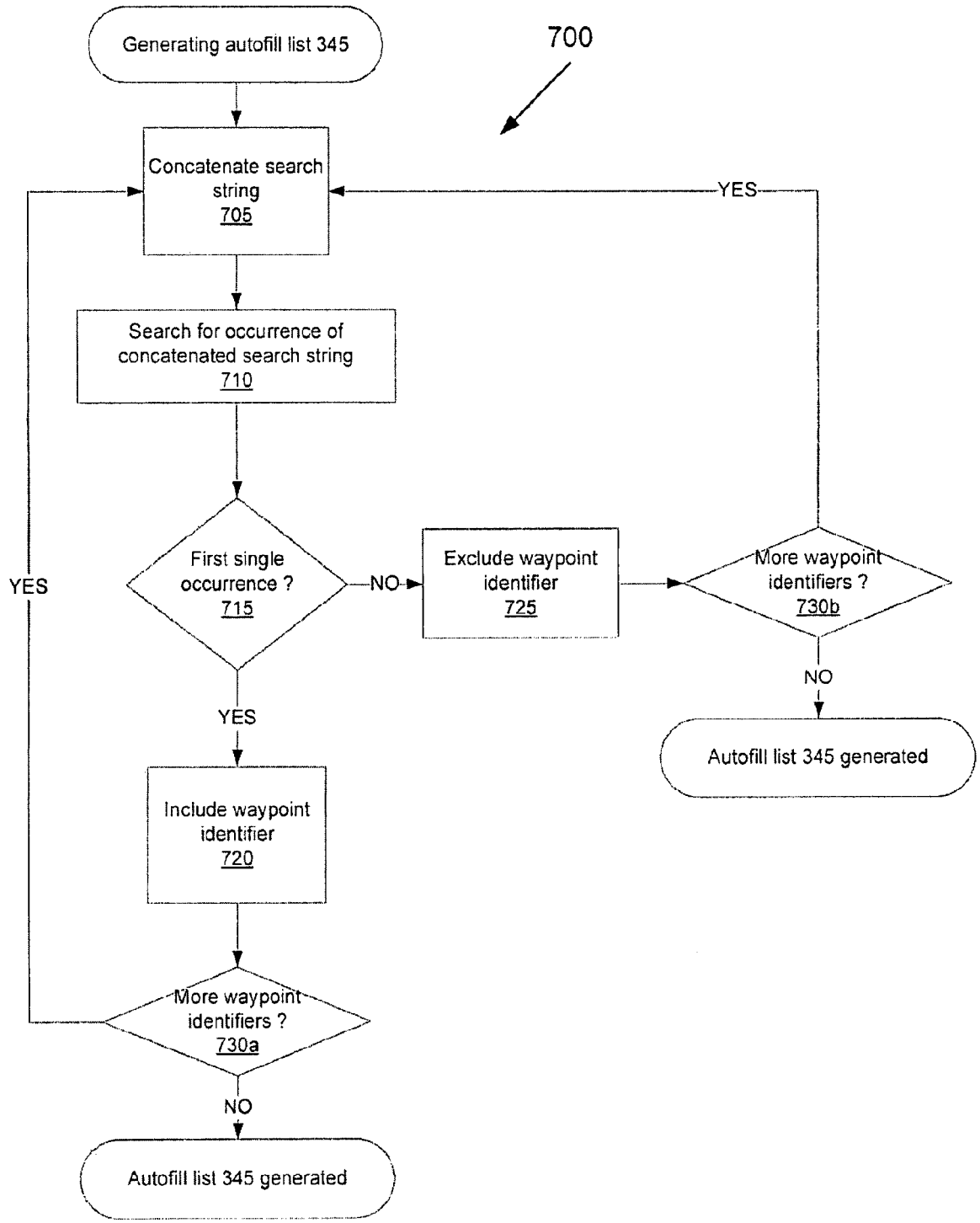
FIG. 7 is a flow chart of an example process for generating an autofill list of waypoint identifiers in accordance with an example embodiment of the present invention.

FIG. 7 is a flow diagram illustrating an example process 700 for generating an autofill list of waypoint identifiers (e.g., 345 of FIG. 3D) from a database of waypoint identifiers (e.g., 305 of FIG. 3D) using a search string (e.g., 325 of FIG. 3D) and a character from a set of characters (e.g., 330 of FIG. 3D). The search string 325 is concatenated (705) with a character from the set of characters 330 to form a concatenated search string.

The database of waypoint identifiers 305 is searched (710) for an occurrence of the concatenated search string. If a first single occurrence of the concatenated search string is found (715) (i.e., a waypoint identifier beginning with the concatenated search string and proceeding other occurrences of the concatenated search string, for example, alphanumerically or by some other ordering) the waypoint identifier is included (720) in the autofill list of waypoint identifiers 345. If, however, a first single occurrence is not found, the waypoint identifier is excluded (725) from the autofill list of waypoint identifiers 345.

After including the waypoint identifier (720) or excluding the waypoint identifier (725) from the autofill list of waypoint identifiers 345, if there are more waypoint identifiers (730a and 730b) in the database of waypoint identifiers 305, the process 700 returns to concatenate (705) the search string 325 with a next character from the set of characters 330. Consequently, the autofill list of waypoint identifiers 345 includes a first single occurrence for each concatenated search string.

Figure 8:
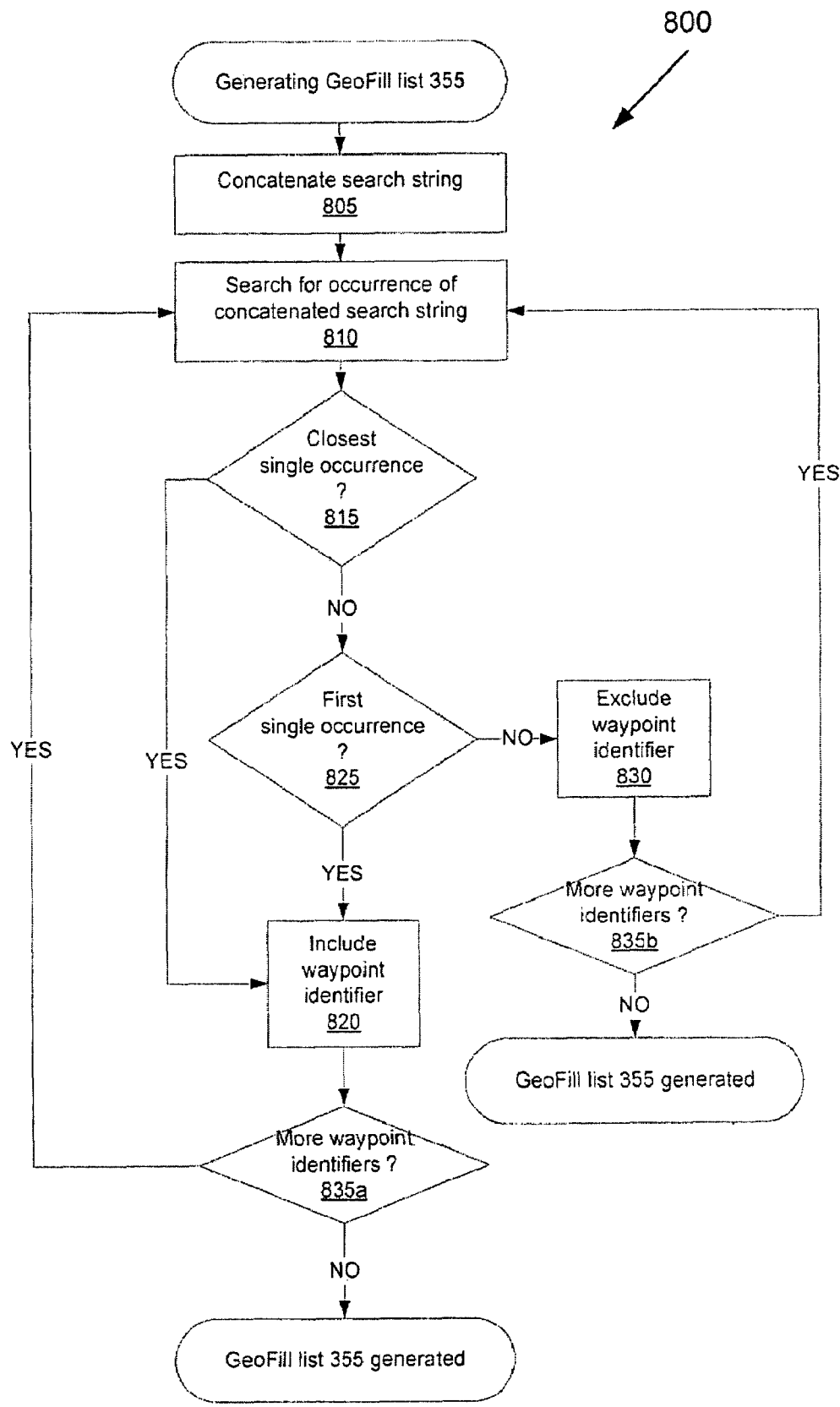
FIG. 8 is a flow chart of an example process for generating a GeoFill list of waypoint identifiers in accordance with an example embodiment of the present invention.

FIG. 8 is a flow diagram illustrating an example process 800 for generating a GeoFill list of waypoint identifiers (e.g., 355 of FIG. 3E) from a combination of a final vicinity list of waypoint identifiers (e.g., 335 of FIG. 3E) and an autofill list of waypoint identifiers (e.g., 345 of FIG. 3E) using a search string (e.g., 325 of FIG. 3E) and a character from a set of characters (e.g., 330 of FIG. 3E). Recall from FIG. 6 above, the final vicinity list 335 of waypoint identifiers includes a respective geographically closest single occurrence of each concatenated search string. Also recall from FIG. 7 above, the autofill list 345 of waypoint identifiers includes a first single occurrence of each concatenated search string.

The search string 325 is concatenated (805) with a character from the set of characters 330 to form a concatenated search string. The final vicinity list 335 of waypoint identifiers and the autofill list 345 of waypoint identifiers are searched (810) for an occurrence of the concatenated search string. If a geographically closest single occurrence of the concatenated search string is found (815) (i.e., a waypoint identifier from the final vicinity list 335 of waypoint identifiers), the found waypoint identifier is included (820) in the GeoFill list 355 of waypoint identifiers. If, however, a geographically closest single occurrence is not found, but a first single occurrence of the concatenated search string is found (825) (i.e., a waypoint identifier from the autofill list 345 of waypoint identifiers) the found waypoint identifier is included (820) in the GeoFill list 355 of waypoint identifiers. If neither a geographically closest single occurrence nor a first single occurrence is found, no waypoint identifier is added (830) to the GeoFill list 355 of waypoint identifiers at this time.

After including the waypoint identifier (820) or excluding the waypoint identifier (830) from the GeoFill list 355 of waypoint identifiers, if there are more waypoint identifiers (835a and 835b) in the final vicinity list 335 of waypoint identifiers or the autofill list 345 of waypoint identifiers, the process 800 returns to concatenate (805) the search string 325 with a next character from the set of characters 330. Consequently, the GeoFill list 355 of waypoint identifiers includes a geographically closest single occurrence or a first single occurrence for each concatenated search string.

While this invention has been particularly shown and described with references to preferred embodiments thereof, it will be understood by those skilled in the art that various changes in form and details may be made therein without departing from the scope of the invention encompassed by the appended claims.

For example, the above described apparatuses and processes may not be limited to waypoint identifiers, but may include other types of identifiers, such as procedure identifiers or approach identifiers. In an example embodiment, a database of identifiers may be searched by indicating an identifier type along with providing a search string, a reference position and a vicinity term. Accordingly, the above described apparatuses and processes would be applied to those identifiers having a same type as the indicated identifier type.

Moreover, while some example embodiments are illustrated within the context of aviation, one skilled in the art will readily recognize embodiments of the present invention are applicable to other navigational applications, such as aeronautical, terrestrial, and nautical and the like. For example, embodiments of the GeoFill technique may be used to select navigational waypoints for navigating a car or a ship.

The term "list" is used throughout this disclosure, for example, the GeoFill list of waypoint identifiers 355 of FIG. 3E. It should be noted, however, such use is not intended to limit the present invention to only lists. Generally, example embodiments of the present invention relate to processing a first collection of data or "data collection" and producing a second data collection or "resultant." In processing the first data collection and producing the second data collection, there may be one or more intermediate data collections or "working data collections."

For example, consider FIG. 3C again. The final vicinity list generator 321 processes the initial vicinity list 320 (a first data collection) and produces the final vicinity list 335 (a second data collection). At each iteration in processing the initial vicinity list 320 and producing the final vicinity list 335, there is an intermediate final vicinity list 335a ... 335n (a working data collection).

It should be readily recognized by those skilled in the art that the first data collection, the second data collection, and the working data collection may be implemented as various data computer structures, such as an array or double-linked list. Additionally, such data collections may be presented to a user in a variety of forms and formats, such as a table listing every entry from a data collection or as a single entry listing one entry from a data collection.

It should be understood that the block diagrams (e.g., FIGS. 2A-3E) and flow diagrams (e.g., FIGS. 5-8) may include more or fewer elements, be arranged differently, or be represented differently. It should be understood that implementation may dictate the block and flow diagrams and the number of block and flow diagrams illustrating the execution of embodiments of the invention.

For example, a GeoFill list of waypoint identifiers may be alternatively generated by replacing entities in an autofill list of waypoint identifiers with waypoint identifiers from a vicinity list of waypoint identifiers that match a search string and that are closest to a reference position.

In this alternative implementation, a database of waypoint identifiers is searched for database entities in the vicinity of a reference position. The results of this first search are placed into a "vicinity list" (or an initial vicinity list). The "vicinity" (or vicinity term) is typically defined as an area within a specified radius of the reference position, but may be tuned based on the application. The vicinity list is then filtered such that a "resulting vicinity list" (or final vicinity list) contains the geographically closest entity with a unique identifier (or geographically closest single occurrence of the search string followed by a character from a set of characters).

In removing or otherwise filtering duplicates from the resulting vicinity list, additional criteria may be applied to determine which entity should remain. For example, one may prefer a navaid named "ABC" over a waypoint identifier named "ABCDE" when a search string is "AB", even though the waypoint identifier "ABCDE" may be geographically closer to the reference position.

Once the vicinity list is completely filtered, the database of waypoint identifiers is searched with the search string for all entities starting with the specified search string. The list of waypoint identifier (or autofill list) resulting from this initial search is filtered such that only one entry exists for each possible character following the search string (or a single occurrence of the search string followed by a character from a set of characters).

Each entity in the autofill list that has a matching waypoint identifier in the vicinity list (according to the search string) is replaced with the entity from the vicinity list. The resulting list is considered a GeoFill list. Entities from the GeoFill list are used to fill in an entry field.

The reference position 310 may be defined or otherwise established by current location, location on a flight plan or other appropriate location.

It should be further understood that elements of the block diagrams (e.g., FIGS. 2A-3E) and flow diagrams (e.g., FIGS. 5-8) described above may be implemented in software, hardware, or firmware. In addition, the elements of the block diagrams and flow diagrams described above may be combined or divided in any manner in software, hardware, or firmware. If implemented in software, the software may be written in any language that can support the embodiments disclosed herein. The software may be stored on any form of computer-readable medium, such as random access memory (RAM), read only memory (ROM), compact disk read only memory (CD-ROM), and so forth. In operation, a general purpose or application specific processor loads and executes the software in a manner well understood in the art.

What is claimed is:

1. A computer implemented method for selecting a navigational waypoint for use, the method comprising:
receiving a partially entered waypoint identifier identifying, in part, a navigational waypoint for use;
searching for the navigational waypoint for use from amongst a plurality of waypoint identifiers using the partially entered waypoint identifier and a search criterion other than a criterion based on a pre-existing ordering of the plurality of waypoint identifiers; and
completing the partially entered waypoint identifier based on results from the searching, the completed waypoint identifier forming a user-selectable navigational waypoint for use;
wherein searching includes:
(i) searching for the navigational waypoint for use using as the search criterion a geographical relationship between a location of each waypoint identifier of the plurality of waypoint identifiers and a reference location; and
(ii) returning as the result of the searching, a first waypoint identifier, in an event the geographical relationship is that the distance between the location of the first waypoint identifier and the reference location is within a vicinity term, and returning at least a second waypoint identifier, in an event the geographical relationship is that the distance between the location of the second waypoint identifier and the reference location is within the vicinity term.

2. The computer implemented method of claim 1 wherein receiving a partially entered waypoint identifier includes receiving zero or more characters.

3. The computer implemented method of claim 1 wherein searching includes returning as a result of the searching, a first waypoint identifier, in an event the first waypoint identifier is a first single occurrence of the partially entered waypoint identifier followed by a character from a set of characters, and at least a second waypoint identifier in an event the second waypoint identifier is a first single occurrence of the partially entered waypoint identifier followed by a next character from the set of characters.

4. The method of claim 1 further comprising:
increasing the vicinity term in an event a number of results returned from searching is small in number; and
decreasing the vicinity term in an event the number of results returned from searching is large in number.

5. The method of claim 1 further comprising changing the vicinity term in accordance with an application.

6. The computer implemented method of claim 1 wherein the pre-existing ordering is any: an alphanumerical ordering and an order in which waypoint identifiers are stored.

7. The computer implemented method of claim 1 wherein completing includes completing the partially waypoint identifier for use in a navigational application including any of: aeronautical, terrestrial, and nautical.

8. A computer implemented method for filling in an entry field, the method comprising:
generating an initial vicinity list of waypoint identifiers from a database of waypoint identifiers using a reference position and a vicinity term;
generating a final vicinity list of waypoint identifiers from the initial vicinity list of waypoint identifiers using a search string followed by a character from a set of characters;
generating an autofill list of waypoint identifiers from the database of waypoint identifiers using the search string followed by a character from the set of characters; and
generating a GeoFill list of waypoint identifiers from a combination of the final vicinity list of waypoint identifiers and the autofill list of waypoint identifiers using the search string followed by a character from the set of characters, the GeoFill list of waypoint identifiers being used to fill in the entry field.

9. The method of claim 8 wherein generating the initial vicinity list of waypoint identifiers includes populating the list with waypoint identifiers from the database in an event the distances from the waypoint identifiers to the reference position are within the vicinity term.

10. The method of claim 8 wherein generating the autofill list of waypoint identifiers includes populating the list with: i) a first waypoint identifier from the database in an event the first waypoint identifier is a first single occurrence of the search string followed by the character from the set of characters, and ii) at least one second waypoint identifier from the database in an event the least one second waypoint identifier is a first single occurrence of the search string followed by a next character from the set of characters.

11. The method of claim 8 wherein generating the final vicinity list of waypoint identifiers includes populating the list with: i) a first waypoint identifier from the initial vicinity list in an event the first waypoint identifier is a geographically closest single occurrence of the search string followed by the character from the set of characters, and ii) at least one second waypoint identifier from the initial vicinity list in an event the at least one second waypoint identifier is a geographically closest single occurrence of the search string followed by a next character from the set of characters.

12. The method of claim 8 wherein generating the final vicinity list of waypoint identifiers includes populating the list with a waypoint identifier from the initial vicinity list in an event the waypoint identifier is a preferred single occurrence of the search string followed by a character from the set of characters and there is more than one occurrence of the search string followed by the character from the set of characters in the initial vicinity list.

13. The method of claim 8 wherein generating the GeoFill list of waypoint identifiers includes:
   populating the list with: i) a first waypoint identifier from the final vicinity list in an event the first waypoint identifier is a geographically closest single occurrence of the search string followed by a character from the set of characters or ii) a first waypoint identifier from the autofill list; and
   populating the list with: i) at least one second waypoint identifier from the final vicinity list in an event the at least one waypoint identifier is a geographically closest single occurrence of the search string followed by a next character from the set of characters or ii) at least one second waypoint identifier from the autofill list.

14. The method of claim 13 wherein generating the GeoFill list of waypoint identifiers includes preferring a waypoint identifier from the final vicinity list over a waypoint identifier from the autofill list.

15. The method of claim 8 further comprising:
   increasing the vicinity term in an event the initial vicinity list of waypoint identifiers is small in number; and
   decreasing the vicinity term in an event the initial vicinity list of waypoint identifiers is large in number.

16. The method of claim 8 further comprising changing the vicinity term in accordance with an application.

17. A computer apparatus to fill in an entry field, the apparatus comprising:
   an initial vicinity list generator to generate an initial vicinity list of waypoint identifiers from a database of waypoint identifiers using a reference position and a vicinity term;
   a final vicinity list generator coupled to the initial vicinity generator to generate a final vicinity list of waypoint identifiers from the initial vicinity list of waypoint identifiers using a search string followed by a character from a set of characters;
   an autofill list generator to generate an autofill list of waypoint identifiers from the database of waypoint identifiers using the search string followed by a character from the set of characters; and
   a GeoFill list generator coupled to the final vicinity list generator and the autofill list generator to generate a GeoFill list of waypoint identifiers from a combination of the final vicinity list and the autofill using the search string followed by a character from the set of characters, the GeoFill list of waypoint identifiers being used to fill in the entry field.

18. The apparatus of claim 17 wherein the initial vicinity list generator includes a logic unit to include waypoint identifiers from the database in an event the distance from the waypoint identifiers to the reference position are within the vicinity term.

19. The apparatus of claim 17 wherein the autofill list generator includes a logic unit to include: i) a first waypoint identifier from the initial vicinity list in an event the first waypoint identifier is a first single occurrence of the search string followed by the character from the set of characters, and ii) at least one second waypoint identifier from the initial vicinity list in an event the least one second waypoint identifier is a first single occurrence of the search string followed by a next character from the set of characters.

20. The apparatus of claim 17 wherein the final vicinity list generator includes a logic unit to include: i) a first waypoint identifier from the initial vicinity list in an event the first waypoint identifier is a geographically closest single occurrence of the search string followed by the character from the set of characters, and ii) at least one second waypoint identifier from the initial vicinity list in an event the at least one second waypoint identifier is a geographically closest single occurrence of the search string followed by a next character from the set of characters.

21. The apparatus of claim 17 wherein the final vicinity list generator includes a logic unit to include a waypoint identifier from the initial vicinity list in an event the waypoint identifier is a preferred single occurrence of the search string followed by a character from the set of characters and there is more than one occurrence of the search string followed by the character from the set of characters in the initial vicinity list.

22. The apparatus of claim 17 wherein the GeoFill list generator includes a logic unit to include: i) a first waypoint identifier from the final vicinity list in an event the first waypoint identifier is a geographically closest single occurrence of the search string followed by a character from the set of characters or ii) a first waypoint identifier from the autofill list, and iii) at least one second waypoint identifier from the final vicinity list in an event the at least one waypoint identifier is a geographically closest single occurrence of the search string followed by a next character from the set of characters or iv) at least one second waypoint identifier from the autofill list.

23. The apparatus of claim 22 wherein the logic unit prefers a waypoint identifier from the final vicinity list over a waypoint identifier from the autofill list.

24. The apparatus of claim 17 further comprising:
   a vicinity term increaser coupled to the initial vicinity list generator to increase the vicinity term in an event the initial vicinity list of waypoint identifiers is small in number; and
   a vicinity term decreaser coupled to the initial vicinity list generator to decrease the vicinity term in an event the initial vicinity list of waypoint identifiers is large in number.

25. The apparatus of claim 17 further comprising a vicinity term changing to change the vicinity term in accordance with an application.

26. A computer system selecting a navigational waypoint for use, the system comprising:
   (A) a digital processor configured to execute a set of processes including:
      receiving a partially entered waypoint identifier identifying, in part, a navigational waypoint for use;
      searching for the navigational waypoint for use from amongst a plurality of waypoint identifiers using the partially entered waypoint identifier and a search criterion other than a criterion based on a pre-existing ordering of the plurality of waypoint identifiers; and
      completing the partially entered waypoint identifier based on results from the searching, the completed waypoint identifier forming a user-selectable navigational waypoint for use;
   wherein searching includes:
   (i) searching for the navigational waypoint for use using as the search criterion a geographical relationship between a location of each waypoint identifier of the plurality of waypoint identifiers and a reference location; and
   (ii) returning as the result of the searching, a first waypoint identifier, in an event the geographical relationship is that the distance between the location of the first waypoint identifier and the reference location is within a vicinity term, and returning at least a second waypoint identifier, in an event the geographical relationship is that the distance between the location of the second waypoint identifier and the reference location is within the vicinity term;

(B) a memory accessible to the digital processor, the memory storing the plurality of waypoint identifiers;

(C) a data entry device communicatively coupled to the digital processor, the data entry device enabling partially partial entry of the waypoint identifier; and (D) a display controlled by the digital processor, the display displaying the formed user-selectable navigational waypoint for use.

27. An apparatus for selecting a navigational waypoint for use, the apparatus comprising:

receiving means receiving a partially entered waypoint identifier identifying, in part, a navigational waypoint for use;

search means searching for the navigational waypoint for use from amongst a plurality of waypoint identifiers using the partially entered waypoint identifier and a search criterion other than a criterion based on a pre-existing ordering of the plurality of waypoint identifiers; and completion means completing the partially entered waypoint identifier based on results from the means for searching, the completed waypoint identifier forming a user-selectable navigational waypoint for use;

wherein searching by the search means includes:

(i) searching for the navigational waypoint for use using as the search criterion a geographical relationship between a location of each waypoint identifier of the plurality of waypoint identifiers and a reference location; and (ii) returning as the result of the searching, a first waypoint identifier, in an event the geographical relationship is that the distance between the location of the first waypoint identifier and the reference location is within a vicinity term, and returning at least a second waypoint identifier, in an event the geographical relationship is that the distance between the location of the second waypoint identifier and the reference location is within the vicinity term.

\* \* \* \* \*

UNITED STATES PATENT AND TRADEMARK OFFICE
CERTIFICATE OF CORRECTION

PATENT NO. : 7,668,647 B2
APPLICATION NO. : 11/786523
DATED : February 23, 2010
INVENTOR(S) : Frederic D. Barber, Stephen C. Kroese and Steven Lindsley It is certified that error appears in the above-identified patent and that said Letters Patent is hereby corrected as shown below:

Claim 26, Column 19, Line 8, delete "partially"

Signed and Sealed this

Twentieth Day of April, 2010

David J. Kappos
*Director of the United States Patent and Trademark Office*